United States Patent
Shete et al.

(10) Patent No.: US 12,328,607 B2
(45) Date of Patent: Jun. 10, 2025

(54) APPARATUSES AND METHODS FOR IMPLEMENTING O2 RELATED FUNCTIONS DEFINITIONS WITHIN A TELECOMMUNICATIONS NETWORK

(71) Applicant: RAKUTEN MOBILE, INC., Tokyo (JP)

(72) Inventors: Pankaj Shete, Tokyo (JP); Awn Muhammad, Tokyo (JP)

(73) Assignee: RAKUTEN MOBILE, INC., Tokyo (JP)

(*) Notice: Subject to any disclaimer, the term of this patent is extended or adjusted under 35 U.S.C. 154(b) by 0 days.

(21) Appl. No.: 18/021,424

(22) PCT Filed: Jan. 19, 2023

(86) PCT No.: PCT/US2023/011120
§ 371 (c)(1),
(2) Date: Feb. 15, 2023

(87) PCT Pub. No.: WO2023/191941
PCT Pub. Date: Oct. 5, 2023

(65) Prior Publication Data
US 2024/0267753 A1   Aug. 8, 2024

Related U.S. Application Data

(60) Provisional application No. 63/325,663, filed on Mar. 31, 2022.

(51) Int. Cl.
*H04W 24/02*  (2009.01)
*H04L 41/0806*  (2022.01)
*H04W 4/50*  (2018.01)

(52) U.S. Cl.
CPC ......... *H04W 24/02* (2013.01); *H04L 41/0806* (2013.01); *H04W 4/50* (2018.02)

(58) Field of Classification Search
CPC ...... H04W 24/02; H04W 4/50; H04L 41/0806
(Continued)

(56) References Cited

U.S. PATENT DOCUMENTS

| | | | | |
|---|---|---|---|---|
| 2023/0129575 A1* | 4/2023 | Chou | ............... | H04W 24/10 370/329 |
| 2023/0164759 A1* | 5/2023 | Guchhait | ............... | H04W 24/02 370/328 |
| 2024/0196178 A1* | 6/2024 | Ying | ............... | H04W 8/18 |

OTHER PUBLICATIONS

Written Opinion of the International Searching Authority dated May 2, 2023 In Application No. PCT/US2023/011120.
(Continued)

*Primary Examiner* — Karen C Tang
(74) *Attorney, Agent, or Firm* — Sughrue Mion, PLLC

(57) ABSTRACT

Apparatuses and methods for a non-real-time radio access network intelligence controller (NRT-RIC) framework in an open radio access network (O-RAN), the apparatus includes: a memory storing instructions; and at least one processor configured to implement the NRT-RIC framework to: receive, from an rApp hosted by the NRT-RIC, at least one request of at least one R1-O2-related service via an R1 interface within the O-RAN architecture between rApps and the NRT-RIC framework; and send, from the NRT-RIC framework to the rApp, at least one response of the at least one R1-O2-related service via the R1 interface; wherein the at least one request and the at least one response are implemented as data types comprising a plurality of R1 data models of an R1 application protocol that enable the NRT-RIC framework and the rApp to produce and/or consume data of the at least one R1-O2 related service in the NRT-RIC.

20 Claims, 6 Drawing Sheets

(58) Field of Classification Search
USPC .......................................................... 709/224
See application file for complete search history.

(56) References Cited

OTHER PUBLICATIONS

International Search Report dated May 2, 2023 in Application No. PCT/US2023/011120.

* cited by examiner

APPARATUSES AND METHODS FOR IMPLEMENTING O2 RELATED FUNCTIONS DEFINITIONS WITHIN A TELECOMMUNICATIONS NETWORK

CROSS-REFERENCE TO RELATED APPLICATION(S)

This application is a National Stage of International Application No. PCT/US2023/011120 filed Jan. 19, 2023, based on and claims priority from U.S. Provisional Patent Application No. 63/325,663 filed on Mar. 31, 2022, the disclosure of which is incorporated by reference herein in its entirety.

TECHNICAL FIELD

Apparatuses and methods consistent with example embodiments of the present disclosure relate O2-related functions definition of an application protocol for an R1 interface in a non-real-time radio access network intelligence controller (NRT-RIC), and more particularly to O2-related functions to access different services offered by an NRT-RIC platform to an rApp over an R1 interface.

BACKGROUND

A radio access network (RAN) is an important component in a telecommunications system, as it connects end-user devices (or user equipment) to other parts of the network. The RAN includes a combination of various network elements (NEs) that connect the end-user devices to a core network. Traditionally, hardware and/or software of a particular RAN is vendor specific.

Open RAN (O-RAN) technology has emerged to enable multiple vendors to provide hardware and/or software to a telecommunications system. To this end, O-RAN disaggregates the RAN functions into a centralized unit (CU), a distributed unit (DU), and a radio unit (RU). The CU is a logical node for hosting Radio Resource Control (RRC), Service Data Adaptation Protocol (SDAP), and/or Packet Data Convergence Protocol (PDCP) sublayers of the RAN. The DU is a logical node hosting Radio Link Control (RLC), Media Access Control (MAC), and Physical (PHY) sublayers of the RAN. The RU is a physical node that converts radio signals from antennas to digital signals that can be transmitted over the FrontHaul to a DU. Because these entities have open protocols and interfaces between them, they can be developed by different vendors.

FIG. 1 illustrates a related art O-RAN architecture. Referring to FIG. 1, RAN functions in the O-RAN architecture are controlled and optimized by a RIC. The RIC is a software-defined component that implements modular applications to facilitate the multivendor operability required in the O-RAN system, as well as to automate and optimize RAN operations. The RIC is divided into two types: a non-real-time RIC (NRT-RIC) and a near-real-time RIC (nRT RIC).

The NRT-RIC is the control point of a non-real-time control loop and operates on a timescale greater than 1 second within the Service Management and Orchestration (SMO) framework. Its functionalities are implemented through modular applications called rApps (rApp 1, . . . , rApp N), and include: providing policy based guidance and enrichment across the A1 interface, which is the interface that enables communication between the NRT-RIC and the nRT RIC; performing data analytics; Artificial Intelligence/Machine Learning (AI/ML) training and inference for RAN optimization; and/or recommending configuration management actions over the O1 interface, which is the interface that connects the SMO to RAN managed elements (e.g., nRT RIC, O-RAN Centralized Unit (O-CU), O-RAN Distributed Unit (O-DU), etc.).

The nRT RIC operates on a timescale between 10 milliseconds and 1 second and connects to the O-DU, O-CU (disaggregated into the O-CU control plane (O-CU-CP) and the O-CU user plane (O-CU-UP)), and an open evolved NodeB (O-eNB) via the E2 interface. The nRT RIC uses the E2 interface to control the underlying RAN elements (E2 nodes/network functions (NFs)) over a near-real-time control loop. The nRT RIC monitors, suspends/stops, overrides, and controls the E2 nodes (O-CU, O-DU, and O-eNB) via policies. For example, the nRT sets policy parameters on activated functions of the E2 nodes. Further, the nRT RIC hosts xApps to implement functions such as quality of service (QoS) optimization, mobility optimization, slicing optimization, interference mitigation, load balancing, security, etc. The two types of RICs work together to optimize the O-RAN. For example, the NRT-RIC provides, over the A1 interface, the policies, data, and artificial intelligence/machine learning AI/ML models enforced and used by the nRT RIC for RAN optimization, and the nRT returns policy feedback (i.e., how the policy set by the NRT-RIC works).

The SMO framework, within which the NRT-RIC is located, manages and orchestrates RAN elements. Specifically, the SMO manages and orchestrates what is referred to as the O-Ran Cloud (O-Cloud). The O-Cloud is a collection of physical RAN nodes that host the RICs, O-CUs, and O-DUs, the supporting software components (e.g., the operating systems and runtime environments), and the SMO itself. In other words, the SMO manages the O-Cloud from within. The O2 interface is the interface between the SMO and the O-Cloud it resides in. Through the O2 interface, the SMO provides infrastructure management services (IMS) and deployment management services (DMS).

The SMO performs management and orchestration of RAN elements through four key interfaces: the A1 Interface between the NRT-RIC in the SMO and the nRT-RIC for RAN Optimization; the O1 Interface between the SMO and the O-RAN Network Functions for FCAPS support; in the case of a hybrid model, an Open Fronthaul M-plane interface between SMO and O-RU for FCAPS support; the O2 Interface between the SMO and the O-Cloud to platform resources and workload management.

The O-Cloud, on the other hand, is a cloud computing platform comprising a collection of physical infrastructure nodes that meet O-RAN requirements to host the relevant O-RAN functions (e.g., nRT-RIC, O-CU-CP, O-CU-UP, O-DU, etc.), the supporting software components (such as Operating System, Virtual Machine Monitor, Container Runtime, etc.) and the appropriate management and orchestration functions.

SUMMARY

According to embodiments, apparatuses and methods are provided for implementing a non-real-time radio access network intelligent controller (NRT-RIC) framework of the NRT-RIC that in its role of an R1 service producer communicates with at least one R1 service consumer rApp hosted in the NRT-RIC based on an R1-O2 application protocol comprising a plurality of O2-related R1 services, wherein O2-related functions provide the plurality of O2-related R1 services that allow a network operator to effectively manage (standardize) rApp applications from multiple vendors to define requirements for the NRT-RIC platform.

According to an embodiment, an apparatus for a non-real-time radio access network intelligence controller (NRT-RIC) framework in an open radio access network (O-RAN), the apparatus includes: a memory storing instructions; and at least one processor configured to implement the NRT-RIC framework of an NRT-RIC to: receive, from an rApp hosted by the NRT-RIC, at least one request of at least one R1-O2-related service via an R1 interface within the O-RAN architecture between rApps and the NRT-RIC framework; and send, from the NRT-RIC framework to the rApp, at least one response of the at least one R1-O2-related service via the R1 interface; wherein the at least one request and the at least one response are implemented as data types comprising a plurality of R1 data models of an R1 application protocol that enable the NRT-RIC framework and the rApp to produce and/or consume data of the at least one R1-O2 related service in the NRT-RIC.

The at least one R1-O2 related service may relate to at least one O-Cloud infrastructure management (IM) service for managing an O-Cloud infrastructure, and the at least one processor may be further configured to implement the NRT-RIC framework to: receive, from the rApp hosted by the NRT-RIC, a request of the at least one O-Cloud IM service via the R1 interface within the O-RAN architecture; and send, from the NRT-RIC framework to the rApp, a response of the at least one O-Cloud IM via the R1 interface within the O-RAN architecture.

The at least one O-Cloud infrastructure management (IM) service for accessing infrastructure resource control information may include at least one of an infrastructure inventory service, an infrastructure monitoring service, an infrastructure provisioning service.

The at least one O-Cloud infrastructure management (IM) service for application management may include an infrastructure lifecycle management service and/or infrastructure software management service.

The at least one R1-O2 related service may include at least one O-Cloud deployment management (DM) service for accessing deployment information of network functions hosted in the O-Cloud, and the at least one processor may be further configured to implement the NRT-RIC framework to: receive, from the rApp hosted by the NRT-RIC, a request of the at least one O-Cloud DM service via the R1 interface within the O-RAN architecture; and send, from the NRT-RIC framework to the rApp, a response of the at least one O-Cloud DM service via the R1 interface within the O-RAN architecture.

The at least one O-Cloud DM service for retrieving deployment information may include at least one of a deployment inventory service, deployment monitoring service, and deployment lifecycle management service.

The at least one processor may be further configured to implement the NRT-RIC framework to receive, from the rApp hosted by the NRT-RIC, a provisioning of changes of a configuration of the O-Cloud.

According to an embodiment, a method, implemented by a non-real-time radio access network intelligence controller (NRT-RIC) framework in an open radio access network (O-RAN), for providing R1-O2 related services, the method includes: receiving, from an rApp hosted by the NRT-RIC, at least one request of at least one R1-O2-related service via an R1 interface within the O-RAN architecture between rApps and the NRT-RIC framework; and sending, from the NRT-RIC framework to the rApp, at least one response of the at least one R1-O2-related service via the R1 interface; wherein the at least one request and the at least one response are implemented as data types comprising a plurality of R1 data models of an R1 application protocol that enable the NRT-RIC framework and the rApp to produce and/or consume data of the at least one R1-O2 related service in the NRT-RIC.

The at least one R1-O2 related service may relate to at least one O-Cloud infrastructure management (IM) service for managing an O-Cloud infrastructure, wherein the receiving may include receiving, from the rApp hosted by the NRT-RIC, a request of the at least one O-Cloud IM service via the R1 interface within the O-RAN architecture; and the sending may include sending, from the NRT-RIC framework to the rApp, a response of the at least one O-Cloud IM via the R1 interface within the O-RAN architecture.

The at least one O-Cloud infrastructure management (IM) service for accessing infrastructure resource control information may include at least one of an infrastructure inventory service, an infrastructure monitoring service, an infrastructure provisioning service.

The at least one O-Cloud infrastructure management (IM) service for application management may include an infrastructure lifecycle management service and/or infrastructure software management service.

The at least one R1-O2 related service may include at least one O-Cloud deployment management (DM) service for accessing deployment information of network functions hosted in the O-Cloud, and the receiving may include receiving, from the rApp hosted by the NRT-RIC, a request of the at least one O-Cloud DM service via the R1 interface within the O-RAN architecture; and the sending may include sending, from the NRT-RIC framework to the rApp, a response of the at least one O-Cloud DM service via the R1 interface within the O-RAN architecture.

The at least one O-Cloud DM service for retrieving deployment information may include at least one of a deployment inventory service, deployment monitoring service, and deployment lifecycle management service.

The receiving may include receiving, from the rApp hosted by the NRT-RIC, a provisioning of changes of a configuration of the O-Cloud.

According to an embodiment, a non-transitory computer-readable recording medium having recorded thereon instructions executable by at least one processor implementing a non-real-time radio access network intelligence controller (NRT-RIC) framework in an open radio access network (O-RAN), to perform a method for providing R1-O2 related services, the method includes: receiving, from an rApp hosted by the NRT-RIC, at least one request of at least one R1-O2-related service via an R1 interface within the O-RAN architecture between rApps and the NRT-RIC framework; and sending, from the NRT-RIC framework to the rApp, at least one response of the at least one R1-O2-related service via the R1 interface; wherein the at least one request and the at least one response are implemented as data types comprising a plurality of R1 data models of an R1 application protocol that enable the NRT-RIC framework and the rApp to produce and/or consume data of the at least one R1-O2 related service in the NRT-RIC.

The at least one R1-O2 related service may relate to at least one O-Cloud infrastructure management (IM) service for managing an O-Cloud infrastructure, the at least one processor may be further configured to implement the NRT-RIC framework to: the receiving may include receiving, from the rApp hosted by the NRT-RIC, a request of the at least one O-Cloud IM service via the R1 interface within the O-RAN architecture; and the sending may include sending, from the NRT-RIC framework to the rApp, a response of the at least one O-Cloud IM via the R1 interface within the O-RAN architecture.

The at least one O-Cloud infrastructure management (IM) service for application management may include an infrastructure lifecycle management service and/or infrastructure software management service.

The at least one R1-O2 related service may include at least one O-Cloud deployment management (DM) service for accessing deployment information of network functions hosted in the O-Cloud, and the receiving may include receiving, from the rApp hosted by the NRT-RIC, a request of the at least one O-Cloud DM service via the R1 interface within the O-RAN architecture; and the sending may include sending, from the NRT-RIC framework to the rApp, a response of the at least one O-Cloud DM service via the R1 interface within the O-RAN architecture.

The at least one O-Cloud DM service for retrieving deployment information may include at least one of a deployment inventory service, deployment monitoring service, and deployment lifecycle management service.

The receiving may include receiving, from the rApp hosted by the NRT-RIC, a provisioning of changes of a configuration of the O-Cloud.

Additional aspects will be set forth in part in the description that follows and, in part, will be apparent from the description, or may be realized by practice of the presented embodiments of the disclosure.

BRIEF DESCRIPTION OF THE DRAWINGS

Features, aspects and advantages of certain exemplary embodiments of the disclosure will be described below with reference to the accompanying drawings, in which like reference numerals denote like elements, and wherein.

DETAILED DESCRIPTION

The following detailed description of exemplary embodiments refers to the accompanying drawings. The same reference numbers in different drawings may identify the same or similar elements.

The foregoing disclosure provides illustration and description, but is not intended to be exhaustive or to limit the implementations to the precise form disclosed. Modifications and variations are possible in light of the above disclosure or may be acquired from practice of the implementations. Further, one or more features or components of one embodiment may be incorporated into or combined with another embodiment (or one or more features of another embodiment). Additionally, in the flowcharts and descriptions of operations provided below, it is understood that one or more operations may be omitted, one or more operations may be added, one or more operations may be performed simultaneously (at least in part), and the order of one or more operations may be switched.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code. It is understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Also, as used herein, the terms "has," "have," "having," "include," "including," or the like are intended to be open-ended terms. Further, the phrase "based on" is intended to mean "based, at least in part, on" unless explicitly stated otherwise. Furthermore, expressions such as "at least one of [A] and [B]" or "at least one of [A] or [B]" are to be understood as including only A, only B, or both A and B.

Figure 2:
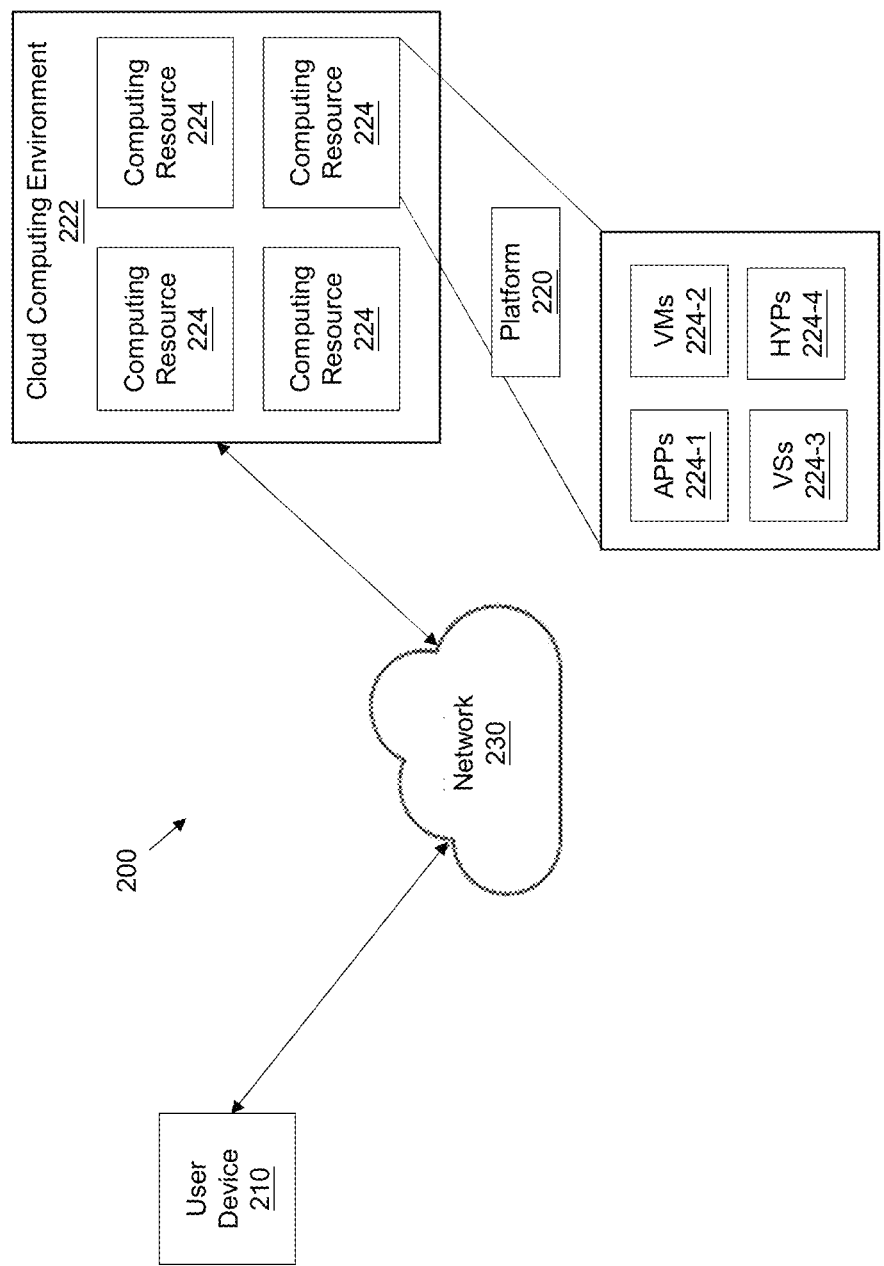
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a user device 210, a platform 220, and a network 220. Devices of environment 200 may interconnect via wired connections, wireless connections, or a combination of wired and wireless connections. In embodiments, any of the functions and operations described with reference to FIGS. 4 through 6 below may be performed by any combination of elements illustrated in FIG. 3.

User device 210 includes one or more devices capable of receiving, generating, storing, processing, and/or providing information associated with platform 220. For example, user device 210 may include a computing device (e.g., a desktop computer, a laptop computer, a tablet computer, a handheld computer, a smart speaker, a server, etc.), a mobile phone (e.g., a smart phone, a radiotelephone, etc.), a wearable device (e.g., a pair of smart glasses or a smart watch), or a similar device. In some implementations, user device 210 may receive information from and/or transmit information to platform 220.

Platform 220 includes one or more devices capable of receiving, generating, storing, processing, and/or providing information. In some implementations, platform 220 may include a cloud server or a group of cloud servers. In some implementations, platform 220 may be designed to be modular such that certain software components may be swapped in or out depending on a particular need. As such, platform 220 may be easily and/or quickly reconfigured for different uses.

In some implementations, as shown, platform 220 may be hosted in cloud computing environment 222. Notably, while implementations described herein describe platform 220 as being hosted in cloud computing environment 222, in some implementations, platform 220 may not be cloud-based (i.e., may be implemented outside of a cloud computing environment) or may be partially cloud-based.

Cloud computing environment 222 includes an environment that hosts platform 220. Cloud computing environment 222 may provide computation, software, data access, storage, etc., services that do not require end-user (e.g., user device 210) knowledge of a physical location and configuration of system(s) and/or device(s) that hosts platform 220. As shown, cloud computing environment 222 may include a group of computing resources 224 (referred to collectively as "computing resources 224" and individually as "computing resource 224").

Computing resource 224 includes one or more personal computers, a cluster of computing devices, workstation computers, server devices, or other types of computation and/or communication devices. In some implementations, computing resource 224 may host platform 220. The cloud resources may include compute instances executing in computing resource 224, storage devices provided in computing resource 224, data transfer devices provided by computing resource 224, etc. In some implementations, computing resource 224 may communicate with other computing resources 224 via wired connections, wireless connections, or a combination of wired and wireless connections.

As further shown in FIG. 2, computing resource 224 includes a group of cloud resources, such as one or more applications ("APPs") 224-1, one or more virtual machines ("VMs") 224-2, virtualized storage ("VSs") 224-3, one or more hypervisors ("HYPs") 224-4, or the like.

Application 224-1 includes one or more software applications that may be provided to or accessed by user device 210. Application 224-1 may eliminate a need to install and execute the software applications on user device 210. For example, application 224-1 may include software associated with platform 220 and/or any other software capable of being provided via cloud computing environment 222. In some implementations, one application 224-1 may send/receive information to/from one or more other applications 224-1, via virtual machine 224-2.

Virtual machine 224-2 includes a software implementation of a machine (e.g., a computer) that executes programs like a physical machine. Virtual machine 224-2 may be either a system virtual machine or a process virtual machine, depending upon use and degree of correspondence to any real machine by virtual machine 224-2. A system virtual machine may provide a complete system platform that supports execution of a complete operating system ("OS"). A process virtual machine may execute a single program, and may support a single process. In some implementations, virtual machine 224-2 may execute on behalf of a user (e.g., user device 210), and may manage infrastructure of cloud computing environment 222, such as data management, synchronization, or long-duration data transfers.

Virtualized storage 224-3 includes one or more storage systems and/or one or more devices that use virtualization techniques within the storage systems or devices of computing resource 224. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 224-4 may provide hardware virtualization techniques that allow multiple operating systems (e.g., "guest operating systems") to execute concurrently on a host computer, such as computing resource 224. Hypervisor 224-4 may present a virtual operating platform to the guest operating systems, and may manage the execution of the guest operating systems. Multiple instances of a variety of operating systems may share virtualized hardware resources.

Network 220 includes one or more wired and/or wireless networks. For example, network 220 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
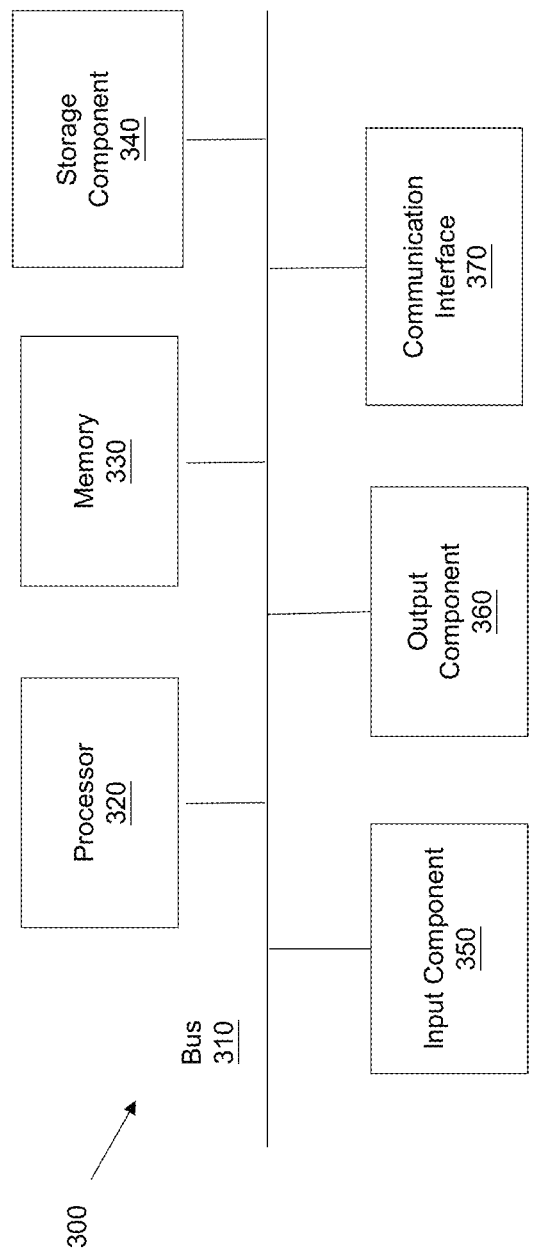
FIG. 3 is a diagram of example components of a device according to an embodiment.

FIG. 3 is a diagram of example components of a device 300. Device 300 may correspond to user device 210 and/or platform 220. As shown in FIG. 3, device 300 may include a bus 310, a processor 320, a memory 320, a storage component 330, an input component 350, an output component 360, and a communication interface 370.

Bus 310 includes a component that permits communication among the components of device 300. Processor 320 may be implemented in hardware, firmware, or a combination of hardware and software. Processor 320 may be a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 320 includes a random-access memory (RAM), a read-only memory (ROM), and/or another type of dynamic or static storage device (e.g., a flash memory, a magnetic memory, and/or an optical memory) that stores information and/or instructions for use by processor 320.

Storage component 330 stores information and/or software related to the operation and use of device 300. For example, storage component 330 may include a hard disk (e.g., a magnetic disk, an optical disk, a magneto-optic disk, and/or a solid-state disk), a compact disc (CD), a digital versatile disc (DVD), a floppy disk, a cartridge, a magnetic tape, and/or another type of non-transitory computer-readable medium, along with a corresponding drive. Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a non-transitory computer-readable medium, such as memory 320 and/or storage component 330. A computer-readable medium is defined herein as a non-transitory memory device. A memory device includes memory space within a single physical storage device or memory space spread across multiple physical storage devices.

Software instructions may be read into memory 320 and/or storage component 330 from another computer-readable medium or from another device via communication interface 370. When executed, software instructions stored in memory 320 and/or storage component 330 may cause processor 320 to perform one or more processes described herein.

Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
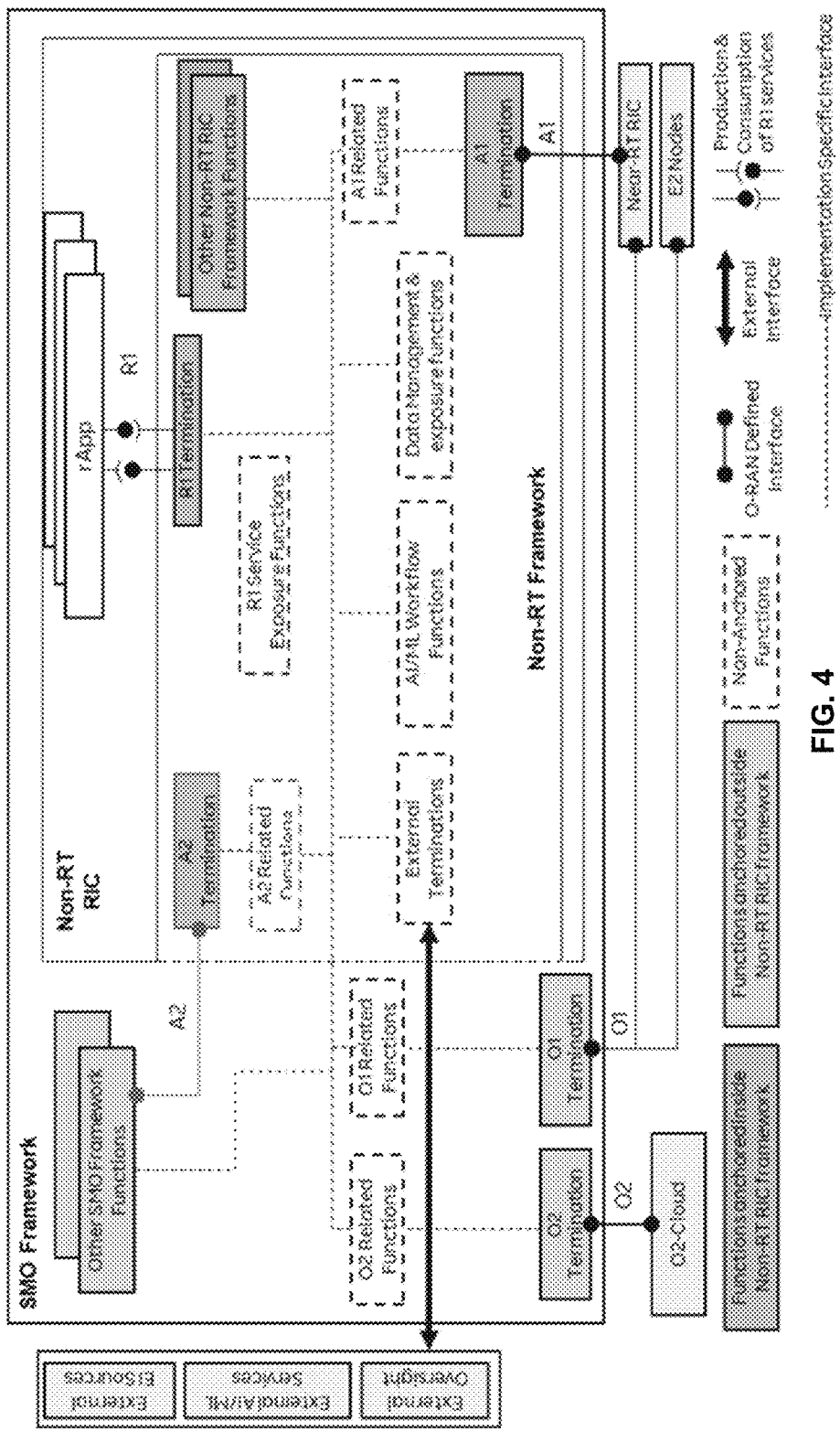
FIG. 4 illustrates the NRT-RIC framework within an O-RAN according to an embodiment.
Figure 5:
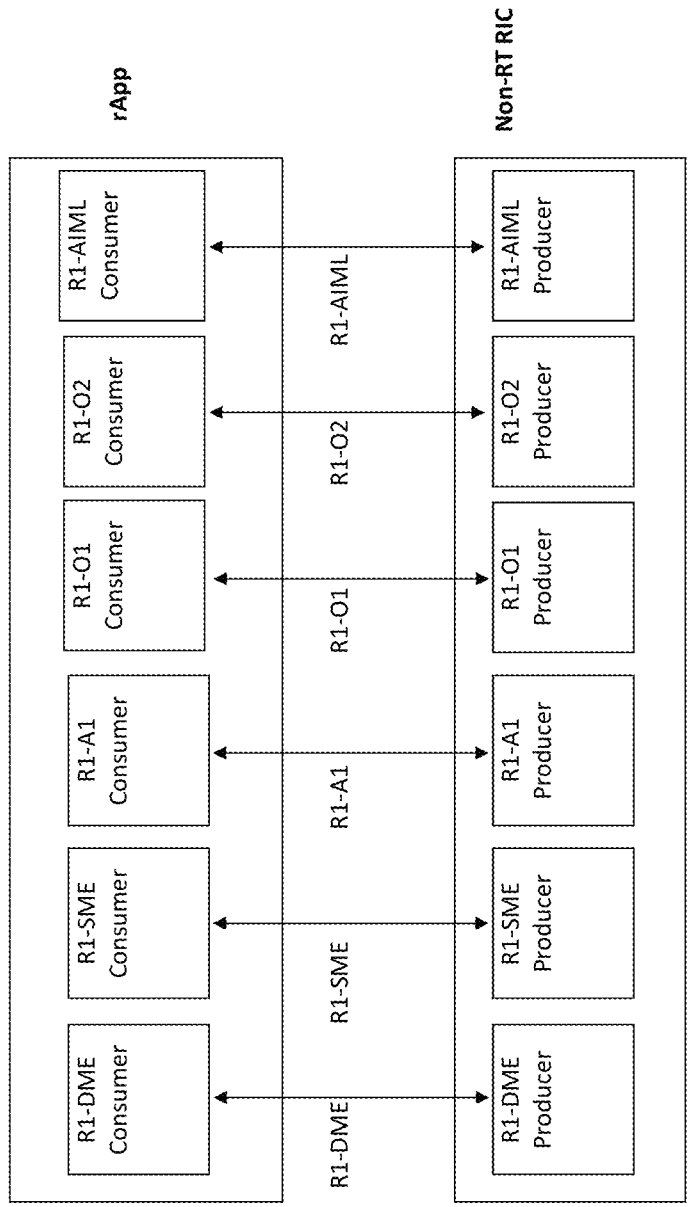
FIG. 5 illustrates the R1 application protocol between an R1 service consumer and an R1 service producer residing in the rApp and/or in the NRT-RIC framework of the NRT-RIC according to an example embodiment.
Figure 6:
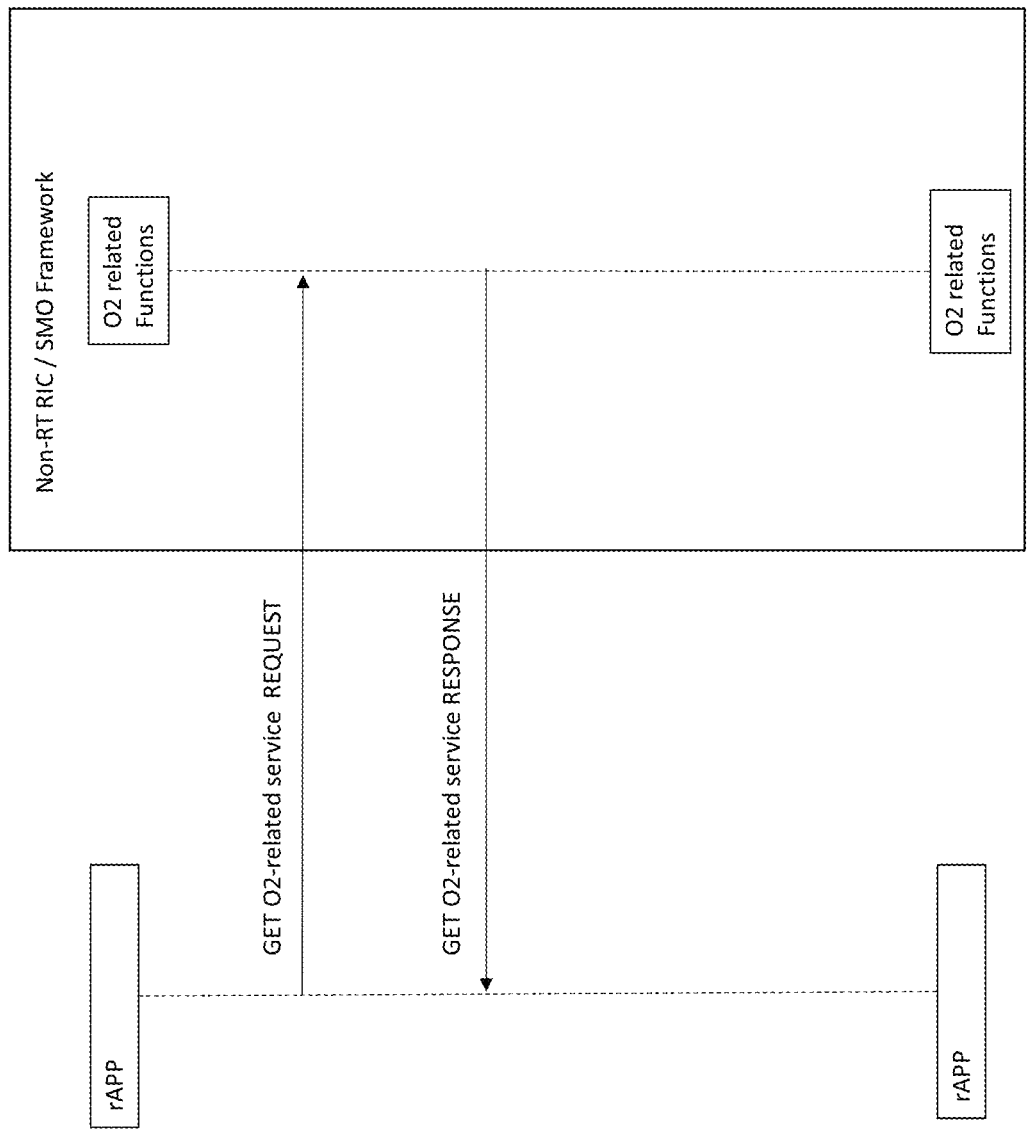
FIG. 6 describes O2-related R1 services of an R1 application protocol for R1-O2-related services according to example embodiments.

In embodiments, any one of the operations or processes of FIGS. 4 to 6 may be implemented by or using any one of the elements illustrated in FIGS. 2 to 3.

FIG. 4 illustrates the NRT-RIC framework (or platform) and the rApp hosted by the NRT-RIC with regard to the R1 interface within the SMO framework system architecture and the O1, O2, A1 interface within an O-RAN according to an embodiment.

Referring to FIG. 4, the NRT-RIC represents a subset of functionalities of the SMO framework. The NRT-RIC can access other SMO framework functionalities and thereby influence (i.e., controls and/or executes) what is carried across the O1 and O2 interface (e.g., performing configuration management (CM) and/or performance management (PM)).

The NRT-RIC includes an NRT-RIC framework. The NRT-RIC framework, among a plurality of other functions, includes R1 service exposure functions that handle R1 services provided in accordance with example embodiments. In general, the NRT-RIC functions within the NRT-RIC framework support the authorization, authentication, registration, discovery, communication support, etc., for the rAPPs.

NRT-RIC Applications (rApps) are applications that leverage the functionalities available in the NRT-RIC framework and/or SMO Framework to provide value-added services related to RAN operation and optimization. The scope of rApps includes, but is not limited to, radio resource management, data analytics, etc., and enrichment of information.

To this end, the NRT-RIC framework produces and/or consumes R1 services according to example embodiments via an R1 interface. The R1 interface terminates in an R1 termination of the NRT-RIC framework. The R1 termination connects to the NRT-RIC framework and the rApps via the R1 interface and enables the NRT-RIC framework and rApps to exchange messages/data (i.e., requests and responses comprising of data models) to access the R1 services via the R1 interface.

Moreover, the NRT-RIC framework comprises A1-related functions. The A1-related functions of the NRT-RIC framework support, for example, A1 logical termination, A1-policy coordination and catalog, A1-E1 coordination and catalog, etc.

The data management and exposure services within the NRT-RIC framework deliver data created or collected by data producers to data consumers according to their needs (e.g., function management (FM)/consumption management (CM)/production management (PM) data to rApps or CM changes from rApps to the O-RAN via the O1 interface.

The NRT-RIC framework further comprises External Terminations. The External Terminations, for example, support an exchange of data between the NRT-RIC framework and external AI/ML functions, Enrichment Information (E1) Sources, or an External Oversight.

Within the NRT-RIC framework, the AI/ML workflow services provide access to AI/ML workflow. For example, the AI/ML workflow services may assist in training models, monitoring, etc. the deployed AI/ML models in NRT-RIC.

Moreover, the NRT-RIC framework comprises A2-related functions that support, for example, A2 logical termination, A2-Policy coordination and catalog, etc.

Still referring to FIG. 4, within the NRT-RIC, the R1 interface is an open logical interface within the O-RAN architecture between the rApps and the NRT-RIC framework of the NRT-RIC. The R1 interface supports the exchange of control signaling information and the collection and delivery of data between endpoints. The R1 interface enables, for example, multi-vendor rApps to consume and/or produce the R1 services.

The R1 interface is independent of specific implementations of the SMO and NRT-RIC framework of the NRT-RIC. The R1 interface is defined in an extensible way that enables new services and data types to be added without needing to change the protocols or the procedures.

In particular, the R1 interface facilitates the interconnection between rApps and the NRT-RIC framework supplied by different vendors (i.e., facilitates interconnection in a multi-vendor environment). To this end, the R1 interface provides a level of abstraction between the rApps and NRT-RIC Framework and/or SMO Framework.

Referring to FIG. 4, the NRT-RIC framework also facilitates the interconnection between the rApps and the O2 termination via O2-related functions of the SMO framework. The O2 termination connects to the O2 interface. The O2 interface is an open logical interface within the O-RAN architecture. The logical functions that produce the O2-related services to rApps via the R1 interface are called the O2-related functions.

The O2-related functions realize, among other functionalities, at least one of the following functionalities: providing O2-related services to rApps over the R1 interface, interfacing with O-Cloud management services, for example, the infrastructure management (IM) services or deployment management (DM) services (i.e., O2-IMS, O2-DMS) through O2 interface termination to obtain FCAPS (fault, configuration, accounting, performance and security) data from the O-Cloud management services, provisioning of configuration changes to the O-Cloud and performing conflict mitigation for configuration changes to the O-Cloud.

With regard to the interfacing with the O-Cloud management services, the O2-related functions receive O-Cloud infrastructure FCAPS data (e.g., performance management (PM), configuration management (CM), fault management (FM) data) from the O-Cloud IMS.

Moreover, O2-related functions receive O-Cloud deployment FCAPS data (e.g., performance management (PM), configuration management (CM), fault management (FM) data) from the O-Cloud DMS.

In the related art, an R1 application protocol for O2-related services in the NRT-RIC framework of the NRT-RIC is not specified.

FIG. 5 illustrates the R1 application protocol between an R1 service consumer and an R1 service producer residing in the rApp and/or in the NRT-RIC framework of the NRT-RIC according to an example embodiment.

Referring to FIG. 5, the R1 AP framework as specified in accordance with an example embodiment includes R1 services and related service procedures.

The R1 services are defined as services that are provided or consumed by rApps and the NRT-RIC framework logical functions. The interoperability of rApps and the NRT-RIC framework logical functions is ensured by support of the related service endpoints but does not depend on the decomposition of logical functions. Being a service producer and/or a service consumer is a role of an rApp or of a logical function in the SMO or the NRT-RIC framework.

For example, R1 services that can be accessed via the R1 interface may include R1-Service Management & Exposure (SME) services, R1-Data Management & Exposure (DME) services, R1-A1 services, R1-O1 services, R1-O2 Data services, R1-AIML services, etc. The exposure services (e.g., SME services and/or DME services) support the extensibility of the R1 services as set forth above.

For example, SME services may include service registration and service discovery services, authentication services, authorization services, communication support services, etc. The DME services deliver data created or collected by data producers (e.g., NRT-RIC framework logical functions) to data consumers (e.g., rApps) according to their needs. The A1-related services provide access to functionality related to A1. The AI/ML workflow services provide access to AI and ML workflows. The O1-related services provide access to functionality related to the O1 interface. The O2-related services provide access to functionality related to the O2 interface.

In an example embodiment, the communication via the R1 interface may be via an R1-SME API, aR1-DME API, an R1-A1 API, an R1-O2 API, an R1-AIML API, R1-O1 API, etc.

In an example embodiment, the APIs may be configured to provide an interface for separate R1 services. In an example embodiment, one or more (or all) the APIs may be configured as one API for the R1 interface. In any case, the R1 AP protocol provides data types and structures (i.e., data models) to implement example embodiments.

Hereinbelow, O2-related R1 services (i.e., R1-O2 services) according to example embodiments are described.

According to the parallel communication between the NRT-RIC framework of the NRT-RIC and the rApp, the R1 AP is based on signaling between an R1 service consumer and an R1 service producer residing in the rApp or in the NRT-RIC framework.

For example, the rApp may relate to an R1 service consumer (i.e., consuming telemetry data of the O-RAN) and the NRT-RIC framework may relate to an R1 service producer (i.e., producing (providing) telemetry data of the O-Cloud). The interactions via the R1 interface between an R1 service consumer and an R1 service producer are based on data retrieved from the O2 interface by the O2 termination of the SMO.

To this end, the R1 producer (e.g., the NRT-RIC framework) handles the resources (i.e., the O-Cloud infrastructure and the deployment thereof within the RAN architecture) on which the R1 consumer (e.g., the rApp) performs operations.

As a result, the terms R1 consumer and R1 producer do not refer to the direction of the data transfer over the R1 interface. To this end, R1 consumers and R1 producers can send requests and responses, respectively.

Still referring to FIG. 5, the O2-related functions provide O2-related services (e.g., R1-O2 Data services) to rApps over the R1 interface. The O2-related R1 services interface with O-Cloud management services, for example, infrastructure management (IM) services and/or deployment management (DM) services (e.g., O2-related O-Cloud IMS and/or O-Cloud DMS) through the O2 termination of the SMO and the NRT-RIC framework to obtain FCAPS (fault, configuration, accounting, performance and security) data from the O-Cloud management services (e.g., IMS services and/or DMS services).

With regard to the interfacing with the O-Cloud IMS, the O2-related functions provide O2-related services (i.e., R1-O2 services) to receive O-Cloud infrastructure FCAPS data (e.g., performance management (PM) data, configuration management (CM) data, fault management (FM) data, etc.) from the O-Cloud IMS.

With regard to interfacing with the O-Cloud DMS, the O2-related functions provide O2 related services (i.e., R1-O2 services) to receive O-Cloud deployment FCAPS data (e.g., performance management (PM) data, configuration management (CM) data, fault management (FM) data, etc.) from the O-Cloud DMS.

In addition, the O2-related services produced by the NRT-RIC framework and/or the SMO framework enable the R1 service consumer (e.g., the rApp) to obtain O-Cloud management service data (e.g., O-Cloud IMS and/or O-Cloud DMS FCAPS data) to provision configuration changes to the O-Cloud and data to perform conflict mitigation for configuration changes to the O-Cloud.

FIG. 6 describes R1-O2-related services of an R1 application protocol for R1-O2-related services according to example embodiments.

Referring to FIG. 6, the NRT-RIC framework in the O-RAN receives, from an rApp hosted by the NRT-RIC, at least one request of at least one R1-O2-related service via an R1 interface within the O-RAN architecture between rApps and the NRT-RIC framework.

Upon receipt of the at least one request, the NRT-RIC framework sends at least one response of the at least one R1-O2-related service via the R1 interface to the rApp, wherein the at least one request and the at least one response are implemented as data types comprising a plurality of R1 data models of an R1 application protocol that enable the NRT-RIC framework and the rApp to produce and/or consume data of the at least one R1-O2 related service in the NRT-RIC.

Figure 1:
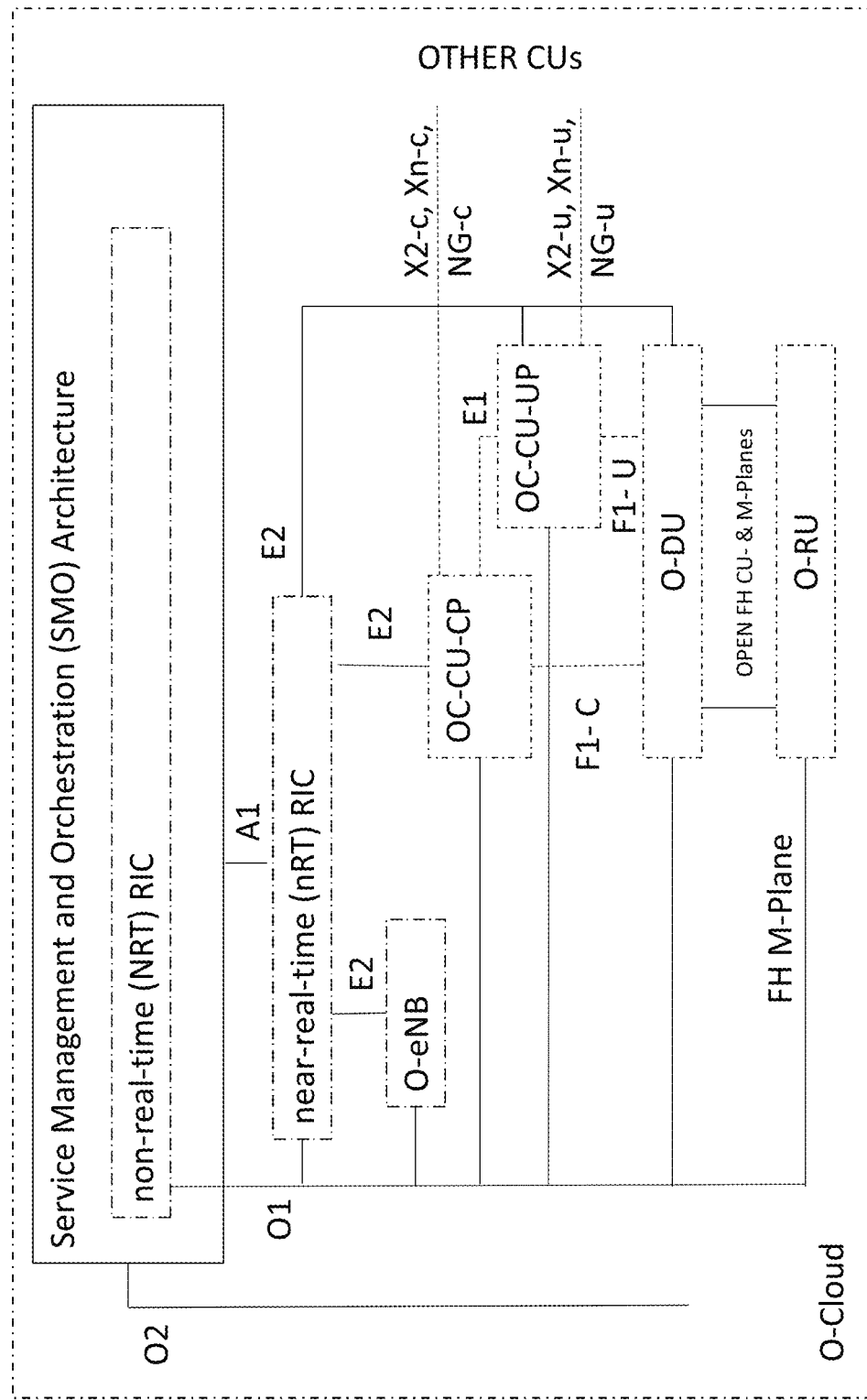
FIG. 1 illustrates an O-RAN architecture in the related art.

In an example embodiment, the R1-O2-related services, via the O-Cloud DMS, may identify at least one network function of the RAN hosted by the O-Cloud resources (e.g., virtual machines (VM) based virtual network functions (VNF) and container (i.e., instance) based cloud-native network functions (CNFs)). In another example embodiment, the R1-O2-related services, via the O-Cloud IMS, may identify at least one physical host (e.g., hardware infrastructure such as servers, server clusters, etc.) in the O-cloud computing within the O-RAN architecture according to FIG. 1 or 4 via the O2 interface.

Referring to O2-related services produced or provided by the SMO/NRT-RIC framework that enables rApps to obtain information related to O-Cloud IMS, the O-Cloud IMS, for example, may include at least one of an infrastructure inventory service, an infrastructure monitoring service, an infrastructure provisioning service, an infrastructure lifecycle management, and an infrastructure software management.

The infrastructure inventory service may manage the O-Cloud computing environment resources (i.e., the hardware inventory) within the O-RAN. The infrastructure monitoring service may monitor the performance of one or more physical hosts hosting the O-Cloud. The infrastructure provisioning service may provide the O-Cloud resources in the O-Cloud. The infrastructure lifecycle management may administrate the maintenance (e.g., update) and/or replacement of O-Cloud resources. The infrastructure software management may schedule or update infrastructure-related software.

Referring to O2-related services produced or provided by the SMO/Non-RT RIC framework that enable rApps to obtain information related to O-Cloud DMS, the O-Cloud DMS, for example, may include at least one of a deployment inventory service, a deployment monitoring service and a deployment lifecycle management service. Furthermore, the O-Cloud DMS may include services to provision changes in the configuration of the O-Cloud and services to obtain additional information related to the O-Cloud.

According to the example embodiments, the NRT-RIC framework, which defines O2-related functions providing a plurality of O2-R1 services based on an R1-O2 application protocol, enables a network operator to effectively manage (standardize) rApp applications from multiple providers to define requirements for the NRT-RIC platform.

The foregoing disclosure provides illustration and description, but is not intended to be exhaustive or to limit the implementations to the precise form disclosed. Modifications and variations are possible in light of the above disclosure or may be acquired from practice of the implementations.

Some embodiments may relate to a system, a method, and/or a computer readable medium at any possible technical detail level of integration. Further, one or more of the above components described above may be implemented as instructions stored on a computer readable medium and executable by at least one processor (and/or may include at least one processor). The computer readable medium may include a computer-readable non-transitory storage medium (or media) having computer readable program instructions thereon for causing a processor to carry out operations.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program code/instructions for carrying out operations may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects or operations.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer readable media according to various embodiments. In this regard, each block in the flowchart or block diagrams may represent a module, segment, or portion of instructions, which comprises one or more executable instructions for implementing the specified logical function(s). The method, computer system, and computer readable medium may include additional blocks, fewer blocks, different blocks, or differently arranged blocks than those depicted in the Figures. In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

What is claimed is:

1. An apparatus for a non-real-time radio access network intelligence controller (NRT-RIC) framework in an open radio access network (O-RAN), the apparatus comprising:
    a memory storing instructions; and
    at least one processor configured to implement the NRT-RIC framework of an NRT-RIC to:
        receive, from an rApp hosted by the NRT-RIC, at least one request of at least one R1-O2-related service via an R1 interface within the O-RAN architecture between rApps and the NRT-RIC framework; and
        send, from the NRT-RIC framework to the rApp, at least one response of the at least one R1-O2-related service via the R1 interface;
    wherein the at least one request and the at least one response are implemented as data types comprising a plurality of R1 data models of an R1 application protocol that enable the NRT-RIC framework and the rApp to produce and/or consume data of the at least one R1-O2 related service in the NRT-RIC; and
    wherein the at least one R1-O2-related service is based on data transmitted over an O2 interface and exposed to the rApp via an O2 termination in a Service Management and Orchestration (SMO) framework of the O-RAN, and via the R1 interface between the O2 termination and an R1 termination in the NRT-RIC framework, and wherein the R1 interface comprises an R1-O2 application programming interface (API).

2. The apparatus as claimed in claim 1, wherein:
    the at least one R1-O2 related service relates to at least one O-Cloud infrastructure management (IM) service for managing an O-Cloud infrastructure, and
    the at least one processor is further configured to implement the NRT-RIC framework to:
        receive, from the rApp hosted by the NRT-RIC, a request of the at least one O-Cloud IM service via the R1 interface within the O-RAN architecture; and
        send, from the NRT-RIC framework to the rApp, a response of the at least one O-Cloud IM via the R1 interface within the O-RAN architecture.

3. The apparatus as claimed in claim 2, wherein the at least one O-Cloud infrastructure management (IM) service for accessing infrastructure resource control information comprises at least one of an infrastructure inventory service, an infrastructure monitoring service, an infrastructure provisioning service.

4. The apparatus as claimed in claim 2, wherein the at least one O-Cloud infrastructure management (IM) service for application management comprises an infrastructure lifecycle management service and/or infrastructure software management service.

5. The apparatus as claimed in claim 1, wherein:
    the at least one R1-O2 related service comprises at least one O-Cloud deployment management (DM) service for accessing deployment information of network functions hosted in the O-Cloud, and
    the at least one processor is further configured to implement the NRT-RIC framework to:
        receive, from the rApp hosted by the NRT-RIC, a request of the at least one O-Cloud DM service via the R1 interface within the O-RAN architecture; and send, from the NRT-RIC framework to the rApp, a response of the at least one O-Cloud DM service via the R1 interface within the O-RAN architecture.

6. The apparatus as claimed in claim 5, wherein the at least one O-Cloud DM service for retrieving deployment information comprises at least one of a deployment inventory service, deployment monitoring service, and deployment lifecycle management service.

7. The apparatus as claimed in claim 1, wherein the at least one processor is further configured to implement the NRT-RIC framework to receive, from the rApp hosted by the NRT-RIC, a provisioning of changes of a configuration of the O-Cloud.

8. A method, implemented by a non-real-time radio access network intelligence controller (NRT-RIC) framework in an open radio access network (O-RAN), for providing R1-O2 related services, the method comprising:
receiving, from an rApp hosted by the NRT-RIC, at least one request of at least one R1-O2-related service via an R1 interface within the O-RAN architecture between rApps and the NRT-RIC framework; and
sending, from the NRT-RIC framework to the rApp, at least one response of the at least one R1-O2-related service via the R1 interface;
wherein the at least one request and the at least one response are implemented as data types comprising a plurality of R1 data models of an R1 application protocol that enable the NRT-RIC framework and the rApp to produce and/or consume data of the at least one R1-O2 related service in the NRT-RIC; and
wherein the at least one R1-O2-related service is based on data transmitted over an O2 interface and exposed to the rApp via an O2 termination in a Service Management and Orchestration (SMO) framework of the O-RAN, and via the R1 interface between the O2 termination and an R1 termination in the NRT-RIC framework, and wherein the R1 interface comprises an R1-O2 application programming interface (API).

9. The method as claimed in claim 8, wherein:
the at least one R1-O2 related service relates to at least one O-Cloud infrastructure management (IM) service for managing an O-Cloud infrastructure, and wherein the receiving comprises receiving, from the rApp hosted by the NRT-RIC, a request of the at least one O-Cloud IM service via the R1 interface within the O-RAN architecture; and
the sending comprises sending, from the NRT-RIC framework to the rApp, a response of the at least one O-Cloud IM via the R1 interface within the O-RAN architecture.

10. The method as claimed in claim 8, wherein the at least one O-Cloud infrastructure
management (IM) service for accessing infrastructure resource control information comprises at least one of an infrastructure inventory service, an infrastructure monitoring service, an infrastructure provisioning service.

11. The method as claimed in claim 8, wherein the at least one O-Cloud infrastructure management (IM) service for application management comprises an infrastructure lifecycle management service and/or infrastructure software management service.

12. The method as claimed in claim 8, wherein:
the at least one R1-O2 related service comprises at least one O-Cloud deployment management (DM) service for accessing deployment information of network functions hosted in the O-Cloud, and
the receiving comprises receiving, from the rApp hosted by the NRT-RIC, a request of the at least one O-Cloud DM service via the R1 interface within the O-RAN architecture; and
the sending comprises sending, from the NRT-RIC framework to the rApp, a response of the at least one O-Cloud DM service via the R1 interface within the O-RAN architecture.

13. The method as claimed in claim 12, wherein the at least one O-Cloud DM service for retrieving deployment information comprises at least one of a deployment inventory service, deployment monitoring service, and deployment lifecycle management service.

14. The method as claimed in claim 8, wherein the receiving comprises receiving, from the rApp hosted by the NRT-RIC, a provisioning of changes of a configuration of the O-Cloud.

15. A non-transitory computer-readable recording medium having recorded thereon instructions executable by at least one processor implementing a non-real-time radio access network intelligence controller (NRT-RIC) framework in an open radio access network (O-RAN), to perform a method for providing R1-O2 related services, the method comprising:
receiving, from an rApp hosted by the NRT-RIC, at least one request of at least one R1-O2-related service via an R1 interface within the O-RAN architecture between rApps and the NRT-RIC framework; and
sending, from the NRT-RIC framework to the rApp, at least one response of the at least one R1-O2-related service via the R1 interface;
wherein the at least one request and the at least one response are implemented as data types comprising a plurality of R1 data models of an R1 application protocol that enable the NRT-RIC framework and the rApp to produce and/or consume data of the at least one R1-O2 related service in the NRT-RIC, and
wherein the at least one R1-O2-related service is based on data transmitted over an O2 interface and exposed to the rApp via an O2 termination in a Service Management and Orchestration (SMO) framework of the O-RAN, and via the R1 interface between the O2 termination and an R1 termination in the NRT-RIC framework, and wherein the R1 interface comprises an R1-O2 application programming interface (API).

16. The non-transitory computer-readable recording medium as claimed in claim 15, wherein:
the at least one R1-O2 related service relate to at least one O-Cloud infrastructure management (IM) service for managing an O-Cloud infrastructure,
the at least one processor is further configured to implement the NRT-RIC framework to:
the receiving comprises receiving, from the rApp hosted by the NRT-RIC, a request of the at least one O-Cloud IM service via the R1 interface within the O-RAN architecture; and
the sending comprises sending, from the NRT-RIC framework to the rApp, a response of the at least one O-Cloud IM via the R1 interface within the O-RAN architecture.

17. The non-transitory computer-readable recording medium as claimed in claim 16, wherein the at least one O-Cloud infrastructure management (IM) service for application management comprises an infrastructure lifecycle management service and/or infrastructure software management service.

18. The non-transitory computer-readable recording medium as claimed in claim 15, wherein:
- the at least one R1-O2 related service comprises at least one O-Cloud deployment management (DM) service for accessing deployment information of network functions hosted in the O-Cloud, and
- the receiving comprises receiving, from the rApp hosted by the NRT-RIC, a request of the at least one O-Cloud DM service via the R1 interface within the O-RAN architecture; and
- the sending comprises sending, from the NRT-RIC framework to the rApp, a response of the at least one O-Cloud DM service via the R1 interface within the O-RAN architecture.

19. The non-transitory computer-readable recording medium as claimed in claim 18, wherein the at least one O-Cloud DM service for retrieving deployment information comprises at least one of a deployment inventory service, deployment monitoring service, and deployment lifecycle management service.

20. The non-transitory computer-readable recording medium as claimed in claim 15, wherein the receiving comprises receiving, from the rApp hosted by the NRT-RIC, a provisioning of changes of a configuration of the O-Cloud.

* * * * *